(12) United States Patent
Lee et al.

(10) Patent No.: US 9,280,963 B1
(45) Date of Patent: Mar. 8, 2016

(54) PAD GENERATING RHYTHMIC SOUND WAVES

(71) Applicant: HYUNDAI MOTOR COMPANY, Seoul (KR)

(72) Inventors: Hui Sung Lee, Gunpo-si (KR); Sung Min Park, Seoul (KR); Sung Jin Sah, Suwon-si (KR); Kwang Myung Oh, Daejeon (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 14/548,282

(22) Filed: Nov. 19, 2014

(30) Foreign Application Priority Data

Aug. 14, 2014 (KR) .................. 10-2014-0105998

(51) Int. Cl.
| | |
|---|---|
| *G10H 1/40* | (2006.01) |
| *G10D 13/02* | (2006.01) |
| *G10D 13/08* | (2006.01) |
| *G06F 3/033* | (2013.01) |
| *G10H 7/00* | (2006.01) |

(52) U.S. Cl.
CPC .................. *G10H 1/40* (2013.01); *G06F 3/033* (2013.01); *G10D 13/02* (2013.01); *G10D 13/021* (2013.01); *G10D 13/024* (2013.01); *G10D 13/027* (2013.01); *G10D 13/029* (2013.01); *G10D 13/08* (2013.01); *G10H 7/00* (2013.01)

(58) Field of Classification Search
CPC ............ G10H 1/40; G10H 7/00; G06F 3/033; G10D 13/02; G10D 13/08; G10D 13/021; G10D 13/024; G10D 13/027; G10D 13/029

USPC ............ 84/635, 611, 600, 411 R, 411 P, 414; 345/173
See application file for complete search history.

(56) References Cited

U.S. PATENT DOCUMENTS

| | | | | |
|---|---|---|---|---|
| 3,439,568 | A | * | 4/1969 | Griffith .................. G10H 1/348 200/532 |
| 3,956,959 | A | * | 5/1976 | Ebihara .................. G10D 13/08 84/725 |

(Continued)

FOREIGN PATENT DOCUMENTS

| | | |
|---|---|---|
| KR | 10-0856919 B1 | 9/2008 |
| KR | 10-2011-0018386 A | 2/2011 |

(Continued)

OTHER PUBLICATIONS

Korean Office Action dated Nov. 16, 2015 issued in Korean Patent Application No. 10-2014-0105998.

*Primary Examiner* — David Warren
*Assistant Examiner* — Christina Schreiber
(74) *Attorney, Agent, or Firm* — McDermott Will & Emery LLP

(57) ABSTRACT

A pad for generating rhythmic sound waves according to an embodiment of the present disclosure comprises: at least two first patterns configured to generate a first sound wave in response to friction; and at least two second patterns configured to generate a second sound wave in response to the friction, wherein each of the first patterns is spaced and positioned in a constant distance, the at least two second patterns are positioned between the spaced first patterns, and for each of specific directions between the spaced first patterns, the first patterns and the second patterns are spaced and positioned in a different distance.

6 Claims, 5 Drawing Sheets

(56) References Cited

U.S. PATENT DOCUMENTS

| | | | | |
|---|---|---|---|---|
| 4,214,504 A | * | 7/1980 | Rex | G10D 13/02 84/411 R |
| 4,479,412 A | * | 10/1984 | Klynas | G10H 3/143 84/730 |
| 5,115,706 A | * | 5/1992 | Aluisi | G10D 13/024 84/723 |
| 5,438,529 A | * | 8/1995 | Rosenberg | G06F 3/0395 702/138 |
| 5,841,052 A | * | 11/1998 | Stanton | G10H 1/32 84/107 |
| 5,986,196 A | * | 11/1999 | Behrenfeld | G10D 13/027 84/411 M |
| 7,030,305 B1 | * | 4/2006 | Cupid | G10H 3/12 84/402 |
| 7,351,898 B2 | * | 4/2008 | Sagastegui | G09B 15/00 84/411 R |
| 7,372,110 B2 | * | 5/2008 | Hatano | H01L 27/12 257/379 |
| 7,745,711 B2 | * | 6/2010 | Kerns | G10D 13/08 84/402 |
| 7,799,983 B2 | * | 9/2010 | Charles | G10D 13/08 84/470 R |
| 8,003,873 B2 | * | 8/2011 | Rasker | G10H 1/0083 84/104 |
| 8,063,296 B2 | * | 11/2011 | Copeland | G10H 1/0066 84/411 R |
| 8,173,886 B2 | * | 5/2012 | Hashimoto | G10D 13/024 84/411 R |
| 8,674,207 B1 | * | 3/2014 | Seymour | G10H 1/0558 84/615 |
| 8,831,248 B2 | * | 9/2014 | Mellow | H03F 1/18 381/116 |
| 8,933,315 B2 | * | 1/2015 | Marquez | G10H 1/0558 84/104 |
| 2002/0196238 A1 | * | 12/2002 | Tsukada | G06F 3/0421 345/173 |
| 2004/0130528 A1 | * | 7/2004 | Baker | G06F 3/0338 345/161 |
| 2005/0188821 A1 | * | 9/2005 | Yamashita | G10H 1/40 84/611 |
| 2006/0011045 A1 | * | 1/2006 | Yamashita | G06F 3/023 84/611 |
| 2007/0070046 A1 | * | 3/2007 | Sheynblat | G06F 3/0433 345/173 |
| 2009/0151475 A1 | * | 6/2009 | Masaki | G01L 1/146 73/862.68 |
| 2011/0072345 A1 | | 3/2011 | Lim | |
| 2011/0102357 A1 | | 5/2011 | Kajitani | |
| 2011/0259677 A1 | * | 10/2011 | Dudde | B66B 7/062 187/411 |
| 2013/0076542 A1 | * | 3/2013 | Tanaka | H03K 17/9647 341/22 |
| 2013/0095343 A1 | * | 4/2013 | Arsene | B21B 1/227 428/600 |
| 2014/0055345 A1 | | 2/2014 | Seo | |
| 2014/0136050 A1 | * | 5/2014 | Lee | B60K 37/06 701/36 |
| 2014/0152580 A1 | * | 6/2014 | Weaver | G06F 3/041 345/173 |
| 2014/0379172 A1 | * | 12/2014 | Park | B60R 16/0373 701/2 |

FOREIGN PATENT DOCUMENTS

| | | |
|---|---|---|
| KR | 10-2011-0030962 A | 3/2011 |
| KR | 10-2011-0086738 A | 7/2011 |
| KR | 10-1210538 B1 | 12/2012 |
| KR | 10-2014-0025926 A | 3/2014 |
| KR | 10-1371749 B1 | 3/2014 |
| WO | 2005/103873 A2 | 11/2005 |
| WO | 2005/103873 A3 | 11/2005 |

* cited by examiner

PAD GENERATING RHYTHMIC SOUND WAVES

CROSS-REFERENCE TO RELATED APPLICATION

This application is based on and claims priority from Korean Patent Application No. 10-2014-0105998, filed on Aug. 14, 2014 in the Korean Intellectual Property Office, the disclosure of which is incorporated herein in its entirety by reference.

TECHNICAL FIELD

The present disclosure relates to a pad for generating rhythmic sound waves, and more particularly, a pad for generating rhythmic sound waves which recognizes a rubbing direction by utilizing only the information of time domain of generated sound waves.

BACKGROUND

Recognizing the rubbing of a user's input action in AUI (Acoustic User Interface) is not easy. In particular, in the case of the sound wave pad with a relatively smooth surface, it is not difficult to generate a tapping signal of a user and recognize it, but it is difficult to generate a signal rubbing the sound wave pad by a user and recognize it.

In order to recognize the rubbing action of a user, a common sound wave pad forms the embossing (slight relief or intaglio pattern) on its surface, and through this, amplifies the sound waves generated by the rubbing. However, even if the sound waves are generated as the above described, it is even more difficult to recognize the direction of rubbing on the sound wave pad consisting of the same medium.

Generally, in order to recognize the rubbing direction on the sound wave pad, the embossing generating the sound quality which is different from each other depending on the direction is also formed. However, this embossing surface treatment must use a complicated analysis algorithm for separately recognizing the rubbing direction through the generated sound quality as well as the cost is increased due to the treatment.

SUMMARY

The object of the present disclosure is to provide a pad for generating rhythmic sound waves comprising a pattern which the sound waves different from each other are generated when a friction is occurred, and capable of recognizing the rubbing direction through the generating time interval of the sound waves generated by friction, by forming the spacing in which a pattern is located to be different from each other depending on the direction.

A pad for generating rhythmic sound waves according to an embodiment of the present disclosure comprises: at least two first patterns configured to generate a first sound wave in response to friction; and at least two second patterns configured to generate a second sound wave in response to the friction, wherein each of the first patterns is spaced and positioned in a constant distance, the at least two second patterns are positioned between the spaced first patterns, and for each of specific directions between the spaced first patterns, the first patterns and the second patterns are spaced and positioned in a different distance.

In an embodiment, the first patterns and the second patterns are patterns formed in relief or intaglio, and because materials or physical characteristics are different from each other, different first sound wave and second sound wave are generated.

In an embodiment, the constant distance which the first patterns are spaced is L, in a top direction of the specific directions between the spaced first patterns, a spaced distance of the first pattern and the second pattern, a spaced distance of the second patterns and a spaced distance of the second pattern and the first pattern are sequentially $$\frac{L}{3} + \Delta l, \frac{L}{3} - \Delta l, \frac{L}{3},$$

in a bottom direction of the specific directions between the spaced first patterns, a spaced distance of the first pattern and the second pattern, a spaced distance of the second patterns and a spaced distance of the second pattern and the first pattern are sequentially $$\frac{L}{3} - \Delta l, \frac{L}{3} - \Delta l, \frac{L}{3} + 2\Delta l,$$

in a right side direction of the specific directions between the spaced first patterns, a spaced distance of the first pattern and the second pattern, a spaced distance of the second patterns and a spaced distance of the second pattern and the first pattern are sequentially $$\frac{L}{3} + \Delta l, \frac{L}{3} + \Delta l, \frac{L}{3} - 2\Delta l,$$

in a left side direction of the specific directions between the spaced first patterns, a spaced distance of the first pattern and the second pattern, a spaced distance of the second patterns and a spaced distance of the second pattern and the first pattern are sequentially $$\frac{L}{3} + \Delta l, \frac{L}{3} + \Delta l, \frac{L}{3} - 2\Delta l,$$

and the $\Delta l$ is $\Delta l < L/6$.

In an embodiment, the first pattern and the second pattern are formed in a polygon or a circular shape surrounding a periphery of the rhythmic sound wave pad.

In an embodiment, for each of specific directions between the spaced first pattern, by analyzing a ratio $t/T$ of a time interval $t$ of a sound wave generated by the spaced distance of the first pattern and the second pattern, the spaced distance of the second patterns and the spaced distance of the second pattern and the first pattern and a time interval $T$ of a sound wave generated by the spaced distance of the first patterns, the specific direction which the friction is progressed is recognized.

In an embodiment, by constituting the ratio $t/T$ in a matrix and defining a characteristic matrix representing a matrix of the ratio $t/T$, the ratio $t/T$ is analyzed.

A pad for generating rhythmic sound waves according to the present disclosure comprises a pattern which the sound waves different from each other are generated when a friction is occurred, and is capable of recognizing the rubbing direction through the generating time interval of the sound waves generated by friction, by forming the spacing in which a pattern is located to be different from each other depending on the direction.

BRIEF DESCRIPTION OF THE DRAWINGS

The above and other objects, features and advantages of the present disclosure will be more apparent from the following detailed description taken in conjunction with the accompanying drawings, in which.

DETAILED DESCRIPTION OF THE PREFERRED EMBODIMENTS

Figure 1:
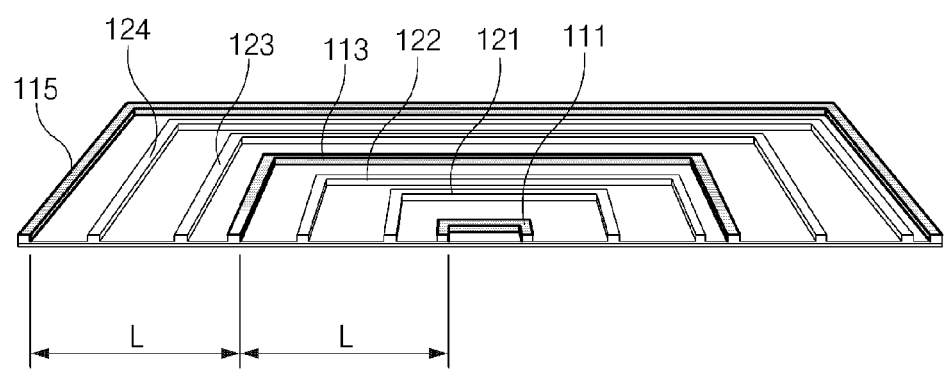
FIG. 1 is a diagram showing a section of a pad for generating rhythmic sound waves according to an embodiment of the present disclosure.

The advantage and features of the present disclosure and how to achieve it will be explained through embodiments described in detail with the accompanying drawings. However, the disclosure is not limited to embodiments described herein and may be embodied in other aspects. Only, the present embodiment is provided for explaining to those skilled in the art to which this disclosure pertains in detail to the extent that it is possible to easily embody the technical spirit of the present disclosure.

In the drawings, embodiments of the present disclosure are not limited to the shown specific aspects and are exaggerated in order to clarify. Although specific terms are used herein, it is only used for explaining the present disclosure, and it is not used for limiting the meaning or the scope of the present disclosure described in the claims.

The expression "and/or" herein is used as the meaning including at least one of components listed before and after the expression. Also, the expression "connected/coupled" is used as the meaning including being directly connected with another component or indirectly connected through another component. A singular form herein also includes a plural form unless it is specially referred in a phrase. Also, the components, steps, operations and elements referred as "comprise" or "comprising" used herein mean the presence or addition of at least one of other components, steps, operations and elements.

Hereinafter, with reference to the drawings an embodiment of the present disclosure will be described in detail.

FIG. 1 is a diagram showing a section of a pad for generating rhythmic sound waves according to an embodiment of the present disclosure.

According to an embodiment of the present disclosure, a first pattern and a second pattern are formed on at least two rhythmic sound wave generating pad surfaces, but the reference which the rhythmic sound wave generating pad has three first patterns 111, 113, 115 and four second patterns 121, 122, 123, 124 will be described.

First, in the first patterns 111, 113, 115, the first sound wave is generated due to the friction of a user. And, the first patterns 111, 113, 115 are spaced at regular distance L and is formed on the surface of the sound wave pad.

In the second patterns 121, 122, 123, 124, the second sound wave is generated due to the friction of a user. Here, the second sound wave is different from the first sound wave, and because the materials or the physical characteristics (height, width, shape, etc.) which the first pattern and the second pattern are formed are different from each other, the waves different from each other are generated. And, at least two second patterns of the second patterns 121, 122, 123, 124 are formed between the first patterns 111, 113, 115 spaced and positioned at regular distance.

In particular, the second patterns 121, 122, 123, 124 are formed so that the distance spaced from the first patterns 111, 113, 115 and the distance spaced from the second patterns 121, 122, 123, 124 are different from each other, for each of a specific direction between the spaced first patterns. In this regard, specific explanation will be continued with reference to FIG. 2.

Figure 2:
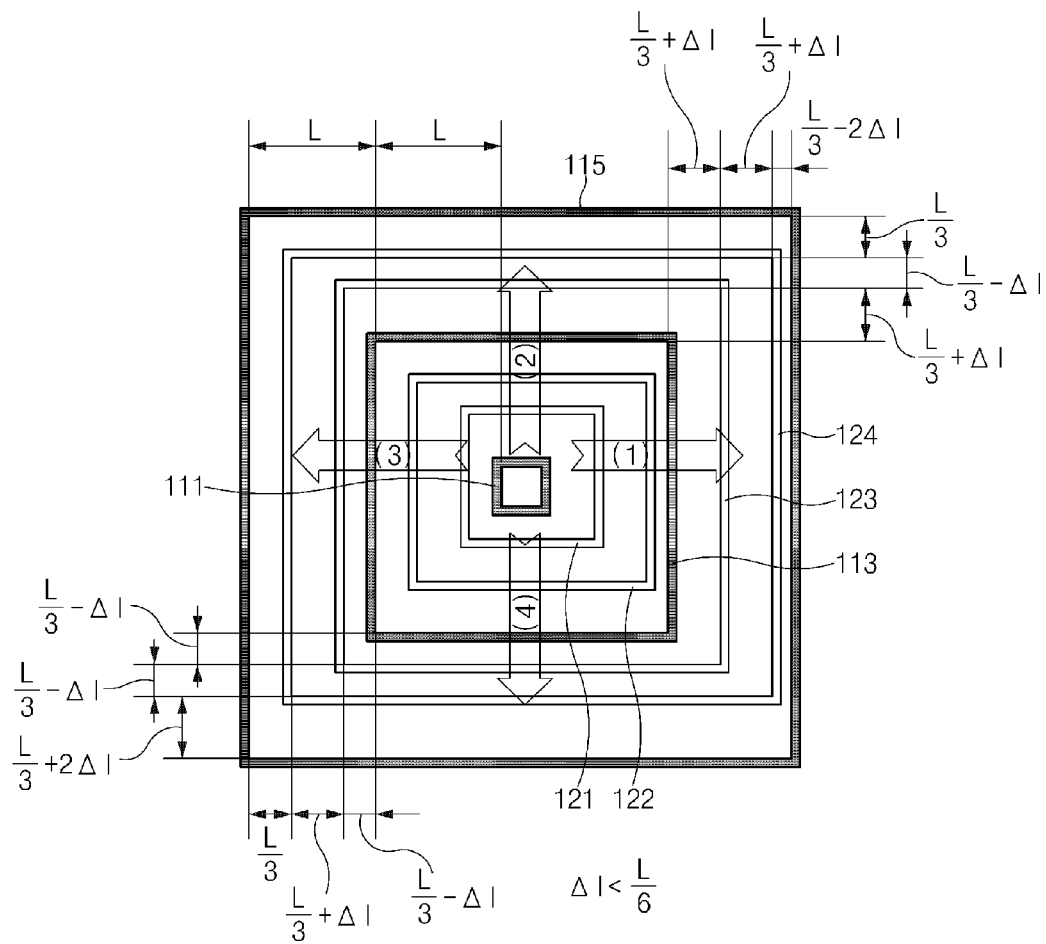
FIG. 2 is a diagram concretely showing the spacing of a pattern formed in a pad for generating rhythmic sound waves according to an embodiment of the present disclosure.

FIG. 2 is a diagram concretely showing the spacing of a pattern formed in a pad for generating rhythmic sound waves according to an embodiment of the present disclosure. FIG. 2 is a diagram which looks down the rhythmic sound wave generating pad shown in FIG. 1 from the top, and concretely shows the example which the first patterns 111, 113, 115 and the second patterns 121, 122, 123, 124 are formed.

First, looking at the overall configuration, the first patterns 111, 113, 115 and the second patterns 121, 122, 123, 124 are constituted in the shape surrounding the periphery of the rhythmic sound wave generating pad, and it is formed as the same rectangular as rhythmic sound wave generating pad. However, the shape of the patterns is not limited to the rectangular, and it may be polygon.

And, looking at the right side (1) direction facing from the one first pattern 113 to the other first pattern 115, the two second patterns 123, 124 are formed between the two first patterns 113, 115. Specifically, the spacing which they are formed will be described.

First, $\Delta l$ is the value which is less than L/6. The spaced distance from the first pattern 113 to the second pattern 123 is $L/3+\Delta l$, the spaced distance from the second pattern 123 to the other second pattern 124 is $L/3+\Delta l$, and the spaced distance from the other second pattern 124 to the other first pattern 115 is $L/3-2\Delta l$.

And, looking at the top (2) direction facing from the one first pattern 113 to the other first pattern 115, the two second patterns 123, 124 are formed between the two first patterns 113, 115. Specifically, the spacing which they are formed will be described.

First, the spaced distance from the first pattern 113 to the second pattern 123 is $L/3+\Delta l$, the spaced distance from the second pattern 123 to the other second pattern 124 is $L/3-\Delta l$, and the spaced distance from the other second pattern 124 to the other first pattern 115 is $L/3$.

And, looking at the left side (3) direction facing from the one first pattern 113 to the other first pattern 115, the two second patterns 123, 124 are formed between the two first patterns 113, 115. Specifically, the spacing which they are formed will be described.

First, the spaced distance from the first pattern 113 to the second pattern 123 is $L/3-\Delta l$, the spaced distance from the second pattern 123 to the other second pattern 124 is $L/3+\Delta l$, and the spaced distance from the other second pattern 124 to the other first pattern 115 is $L/3$.

And, looking at the bottom (4) direction facing from the one first pattern 113 to the other first pattern 115, the two second patterns 123, 124 are formed between the two first patterns 113, 115. Specifically, the spacing which they are formed will be described.

First, the spaced distance from the first pattern 113 to the second pattern 123 is L/3−Δl, the spaced distance from the second pattern 123 to the other second pattern 124 is L/3−Δl, and the spaced distance from the other second pattern 124 to the other first pattern 115 is L/3+2Δl.

As the above described, the spaced distances forming the combination of the first pattern or the second pattern are configured to be different from each other, for each of specific directions (top, bottom, right side, left side) between the spaced first patterns 113, 115. Through this, the rhythmic sound wave generating pad according to the present disclosure can easily recognize the traveling direction of the inputted rubbing by identifying the time intervals, which a first sound wave and a second sound wave are generated, for each of the specific directions (top, bottom, right side, left side), and simply analyzing the information for the time domain of the generated sound waves.

Figure 3:
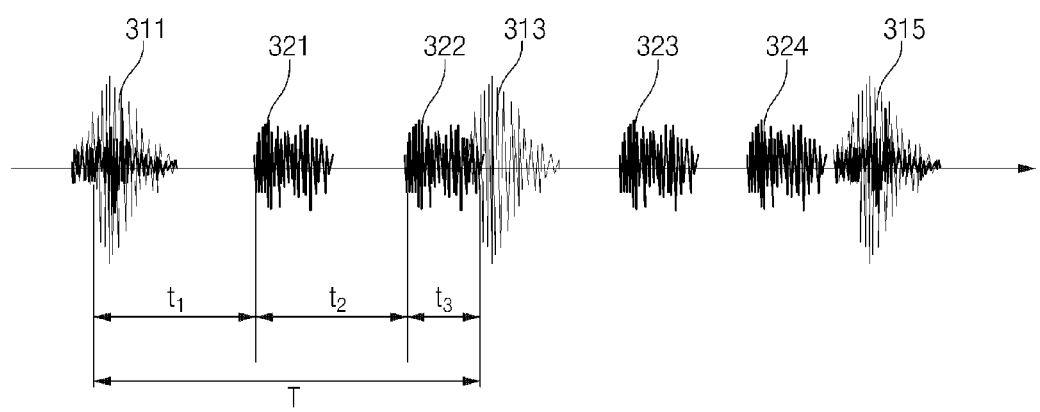
FIG. 3 is a diagram showing the time interval of sound waves generated by friction in a pad for generating rhythmic sound waves according to an embodiment of the present disclosure.

FIG. 3 is a diagram showing the time interval of sound waves generated by friction in a pad for generating rhythmic sound waves according to an embodiment of the present disclosure.

In FIG. 3, the sound wave (a first sound wave; 311, 313, 315) which the amplitude is relatively large is the sound wave generated by the friction of the first patterns 111, 113, 115 explained through the above FIG. 1 and FIG. 2. And, the sound wave (a second sound wave; 321, 322, 323, 324) which the amplitude is relatively small is the sound wave generated by the friction of the second patterns 121, 122, 123, 124 explained through the above FIG. 1 and FIG. 2.

After all, the generated first sound wave and second sound wave are different from each other even by the same friction due to the materials or physical characteristics of the first patterns 111, 113, 115 and the second patterns 121, 122, 123, 124, and in the process detecting the generation of the different sound waves, the time intervals t1, t2, t3, T of the generated sound waves can be detected as shown in FIG. 3.

And, by analyzing the detected time interval t1, t2, t3, T by a simple formula, the specific direction of the rubbing generating friction can be recognized. The details recognizing the rubbing direction by analyzing the time intervals will be described with reference to FIG. 2.

As identified in FIG. 2, at least two second patterns 123, 124 are provided between the first patterns 113, 115, according to each direction (top, bottom, right side, left side), the first patterns 113, 115 and the second patterns 123, 124 are existed in different distances. And, the combination of the spaced distance formed by the first patterns 113, 115 or the second patterns 123, 124 is not same depending on each direction. As described in FIG. 2, the spaced distance of the right side (1) direction is sequentially {L/3+Δl, L/3+Δl, L/3−2Δl}, and in the same way, the spaced distances of the top (2), the left side (3) and the bottom (4) directions are {L/3+Δl, L/3−Δl,L/3}, {L/3−Δl,L/3+Δl, L/3} and {L/3−Δl, L/3−Δl,L/3+2Δl} Here, Δl is the value which is less than L/6.

Here, if the rhythmic sound wave generating pad is rubbed in a certain direction, the first patterns 113, 115 are passed, and also the moving speed v of the finger passing the first patterns 113, 115 is almost constant. Through this, if the time passing the two first patterns 113, 115 is defined as T, the speed of the finger passing the two first patterns 113, 115 is v=L/T. And, if the time which the finger passes n (n is 1 to 3) distance in m direction (m is 1 to 4) is defined as t(m,n), the ratio of the time (α(m,n)) passing the two first patterns 113, 115 for each of directions can be defined as follows:

$$\alpha(m,n) \equiv t(m,n)/T; m=1,\ldots 4; n=1,2,3$$

And, the information for the ratio of the time can be represented by the matrix A as follows:

$$A \equiv \begin{bmatrix} \alpha_{1,1} & \cdots & \alpha_{1,3} \\ \vdots & \ddots & \vdots \\ \alpha_{4,1} & \cdots & \alpha_{4,3} \end{bmatrix} = \begin{bmatrix} \frac{1}{3}+\frac{\Delta l}{L} & \frac{1}{3}+\frac{\Delta l}{L} & \frac{1}{3}-\frac{2\Delta l}{L} \\ \frac{1}{3}+\frac{\Delta l}{L} & \frac{1}{3}-\frac{\Delta l}{L} & \frac{1}{3} \\ \frac{1}{3}-\frac{\Delta l}{L} & \frac{1}{3}+\frac{\Delta l}{L} & \frac{1}{3} \\ \frac{1}{3}-\frac{\Delta l}{L} & \frac{1}{3}-\frac{\Delta l}{L} & \frac{1}{3}+\frac{2\Delta l}{L} \end{bmatrix}$$

After that, the characteristic matrix B subtracting ⅓ from the matrix A and multiplying L/Δl can be defined as follows:

$$B \equiv \frac{L}{\Delta l}\left(A - \frac{1}{3}\right) = \begin{bmatrix} 1 & 1 & -2 \\ 1 & -1 & 0 \\ -1 & 1 & 0 \\ -1 & -1 & 2 \end{bmatrix}$$

And, the rubbing direction can be detected in sequence by the following formula multiplying $[2\ 1\ 0]^T$ to the above calculated matrix B.

$$D \equiv [b_1 \ b_2]\begin{bmatrix} 2 \\ 1 \\ 0 \end{bmatrix} = \begin{bmatrix} 1 & 1 & -2 \\ 1 & -1 & 0 \\ -1 & 1 & 0 \\ -1 & -1 & 2 \end{bmatrix}\begin{bmatrix} 2 \\ 1 \\ 0 \end{bmatrix} = \begin{bmatrix} 3 \\ 1 \\ -1 \\ -3 \end{bmatrix} = \begin{bmatrix} d_1 \\ d_2 \\ d_3 \\ d_4 \end{bmatrix}$$

That is, the ratio is obtained by using the detected time information, and if the combination of its ratio value is close to dm, the touch can be recognized in the m direction.

More specifically describing through FIG. 3, the time interval T of the first sound waves 311, 313 generated by the friction of the first patterns 111, 113 is detected, and the time intervals t1, t2, t3 of the first sound waves 311, 313 and the second sound waves 321, 322 generated by the friction of the first patterns 111, 113 and the second patterns 121, 122 is detected.

And, by using the detected time intervals t1, t2, t3, T, the components of the rubbing direction is calculated as follows:

$$d_t = \frac{L}{\Delta l}\left(\frac{\tau}{T} - \frac{1}{3}\right)\begin{bmatrix} 2 \\ 1 \\ 0 \end{bmatrix}; \quad \tau \equiv [t_1 \ t_2 \ t_3]$$

And, finally, the rubbing direction can be determined by the following formula.

$$aug_m \min|d_t - d_m|$$

That is, the direction component of dm closest to the calculated dt becomes the traveling direction of the current rubbing direction. For example, if dt≈d2, the traveling direction of the rubbing direction is 2, that is, the top direction.

Figure 4:
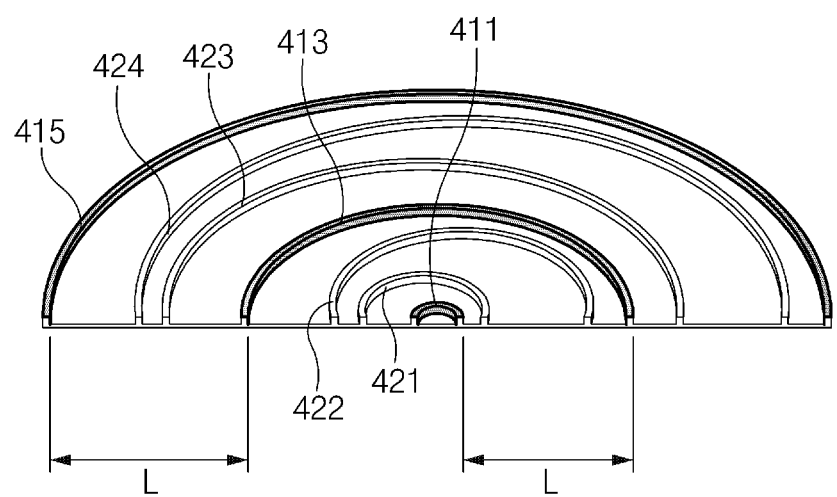
FIG. 4 is a diagram showing a section of a pad for generating rhythmic sound waves according to another embodiment of the present disclosure.
Figure 5:
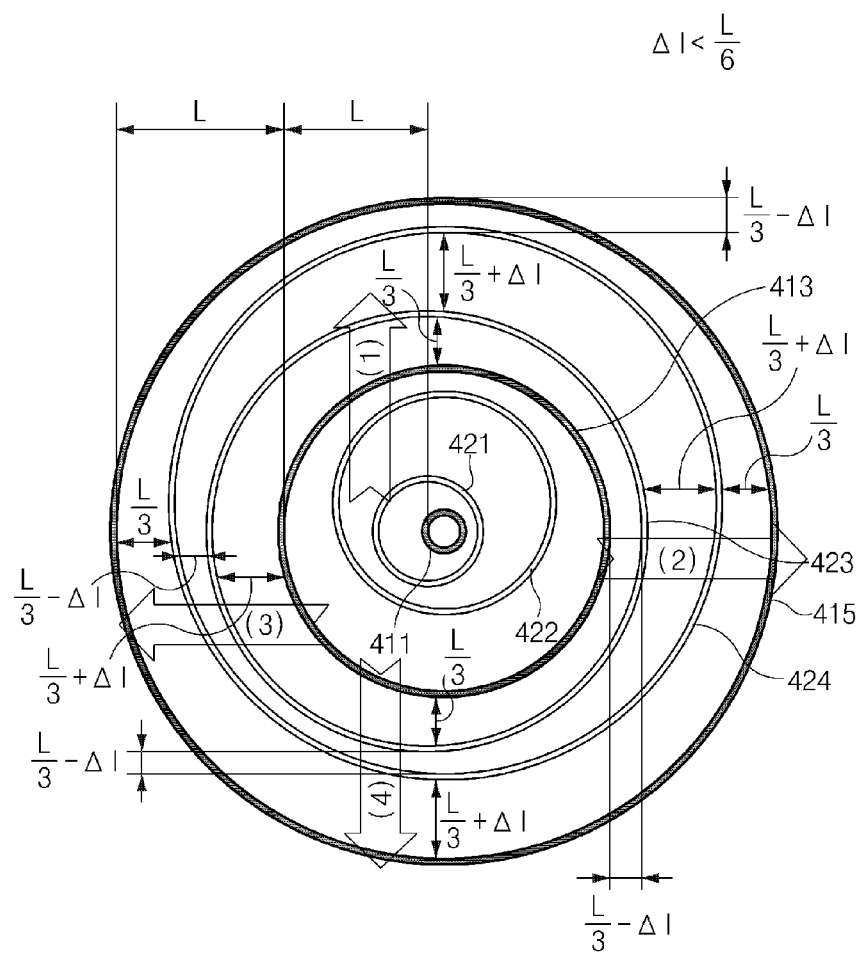
FIG. 5 is a diagram concretely showing the spacing of a pattern formed in a pad for generating rhythmic sound waves according to another embodiment of the present disclosure.

FIG. 4 and FIG. 5 are diagrams showing a section and the spacing of a pattern of a pad for generating rhythmic sound waves according to another embodiment of the present disclosure.

First, in the first patterns 411, 413, 415, the first sound wave is generated due to the friction of a user. And, the first patterns 411, 413, 415 are spaced at regular distance L and is formed on the surface of the sound wave pad.

In the second patterns 421, 422, 423, 424, the second sound wave is generated due to the friction of a user. Here, the second sound wave is different from the first sound wave, and because the materials or the physical characteristics (height, width, shape, etc.) which the first pattern and the second pattern are formed are different from each other, the waves different from each other are generated. And, at least two second patterns of the second patterns 421, 422, 423, 424 are formed between the first patterns 411, 413, 415 spaced and positioned at regular distance.

First, looking at the overall configuration, in contrast to the patterns of FIG. 1 and FIG. 2, the patterns of FIG. 4 and FIG. 5 are formed in a circular. The first patterns 411, 413, 415 and the second patterns 421, 422, 423, 424 are constituted in the shape surrounding the periphery of the rhythmic sound wave generating pad and they are formed in the same circular shape as the circular rhythmic sound wave pad.

And, looking at the top (1) direction facing from the one first pattern 413 to the other first pattern 415, the two second patterns 423, 424 are formed between the two first patterns 413, 415. Specifically, the spacing which they are formed will be described.

First, $\Delta l$ is the value which is less than L/6. The spaced distance from the first pattern 413 to the second pattern 423 is L/3, the spaced distance from the second pattern 423 to the other second pattern 424 is L/3+$\Delta l$, and the spaced distance from the other second pattern 424 to the other first pattern 415 is L/3−$\Delta l$.

And, looking at the right side (2) direction facing from the one first pattern 413 to the other first pattern 415, the two second patterns 423, 424 are formed between the two first patterns 413, 415. Specifically, the spacing which they are formed will be described.

First, the spaced distance from the first pattern 413 to the second pattern 423 is L/3−$\Delta l$, the spaced distance from the second pattern 423 to the other second pattern 424 is L/3+$\Delta l$, and the spaced distance from the other second pattern 424 to the other first pattern 415 is L/3.

And, looking at the left side (3) direction facing from the one first pattern 413 to the other first pattern 415, the two second patterns 423, 424 are formed between the two first patterns 413, 415. Specifically, the spacing which they are formed will be described.

First, the spaced distance from the first pattern 413 to the second pattern 423 is L/3+$\Delta l$, the spaced distance from the second pattern 423 to the other second pattern 424 is L/3−$\Delta l$, and the spaced distance from the other second pattern 424 to the other first pattern 415 is L/3.

And, looking at the bottom (4) direction facing from the one first pattern 413 to the other first pattern 415, the two second patterns 423, 424 are formed between the two first patterns 413, 415. Specifically, the spacing which they are formed will be described.

First, the spaced distance from the first pattern 413 to the second pattern 423 is L/3, the spaced distance from the second pattern 423 to the other second pattern 424 is L/3−$\Delta l$, and the spaced distance from the other second pattern 424 to the other first pattern 415 is L/3+$\Delta l$.

As the above described, the spaced distances forming the combination of the first pattern or the second pattern are configured to be different from each other, for each of specific directions (top, bottom, right side, left side) between the spaced first patterns 413, 415. Through this, the rhythmic sound wave generating pad according to the present disclosure can easily recognize the traveling direction of the inputted rubbing by identifying the time intervals, which a first sound wave and a second sound wave are generated, for each of the specific directions (top, bottom, right side, left side), and simply analyzing the information for the time domain of the generated sound waves.

In the above description, the present disclosure has been described through specific examples, but it may be well understood that various modifications can be made without departing from the scope of the present disclosure. Therefore, the scope of the present disclosure is not limited to the above described embodiments, and it should be defined by the appended claims and their equivalents. When taking the foregoing description into account, if the modifications and variations of the present disclosure fall within the following claims and their equivalents, then it is construed that the present disclosure includes these modifications and variations.

What is claimed is:

1. A pad for generating rhythmic sound waves, the pad comprising:
    at least two first patterns configured to generate a first sound wave in response to friction and spaced apart from each other in an outward direction from a center in an x-y plane; and
    at least two second patterns configured to generate a second sound wave in response to the friction,
    wherein each of the at least two first patterns is spaced and positioned in a constant distance, the at least two second patterns are positioned between two spaced first patterns among the at least two first patterns, and spaced distances between any one of the at least two first patterns and any one of the at least two second patterns are different in the outward direction from the center, and
    wherein the outward direction includes a first direction, a second direction, a third direction, and a fourth direction.

2. The pad according to claim 1, wherein the at least two first patterns and the at least two second patterns are patterns formed in relief or intaglio, and because materials or physical characteristics are different from each other, different first sound wave and second sound wave are generated.

3. The pad according to claim 1, wherein the constant distance which the at least two first patterns are spaced is L,
    in the first direction spaced distance of one first pattern among the at least first patterns and a second pattern adjacent to the one first pattern, a spaced distance of two second patterns among the at least two second patterns, and a spaced distance of another second pattern and another first pattern adjacent to the other second pattern are sequentially $$\frac{L}{3} + \Delta l, \frac{L}{3} - \Delta l, \frac{L}{3},$$

in the second direction spaced distance of the one first pattern and the adjacent second pattern, a spaced distance of the two second patterns, and a spaced distance of the other second pattern and the other first pattern are sequentially $$\frac{L}{3} - \Delta l, \frac{L}{3} - \Delta l, \frac{L}{3} + 2\Delta l,$$

in the third direction spaced distance of one first pattern and the adjacent second pattern, a spaced distance of the two second patterns, and a spaced distance of the other second pattern and the other first pattern are sequentially $$\frac{L}{3}+\Delta l, \frac{L}{3}+\Delta l, \frac{L}{3}-2\Delta l,$$

in the fourth direction spaced distance of the one first pattern and the adjacent second pattern, a spaced distance of the two second patterns, and a spaced distance of the other second pattern and the other first pattern are sequentially $$\frac{L}{3}-\Delta l, \frac{L}{3}+\Delta l, \frac{L}{3},$$

the $\Delta l$ is $\Delta l < L/6$,
the first and second directions are oppoiste to each other
the first direction is vertical to the third and fourth directions, and
the third and fourth directions are opposite to each other.

4. The pad according to claim 1, wherein each of the at least two first patterns and the at least two second patterns has a polygon or a circular shape surrounding a periphery of the rhythmic sound wave pad.

5. The pad according to claim 1, wherein ratio t/T of a time interval t of a sound wave generated by a spaced distance of one first pattern among the at least two first patterns and a second pattern adjacent to the one first pattern, a spaced distance of two second patterns among the at least two second patterns, and a spaced distance of another second pattern and another first pattern adjacent to the other second pattern and a time interval T of a sound wave generated by a spaced distance of the one first pattern and the other first pattern is different for each of the first, second, third, and fourth directions of the outward direction.

6. A pad for generating rhythmic sound waves, the pad comprising:
at least two first patterns configured to generate a first sound wave in response to friction and spaced apart from each other in an outward direction from a center in an x-y plane; and
at least two second patterns configured to generate a second sound wave in response to the friction,
wherein each of the at least two first patterns is spaced and positioned in a constant distance, the at least two second patterns are positioned between two spaced first patterns among the at least two first patterns, and spaced distances between any one of the at least two first patterns and any one of the at least two second patterns are different in the outward direction from the center, and
wherein the outward direction includes a first direction, a second direction, a third direction, and a fourth direction, and
wherein a ratio t/T of a time interval t of a sound wave generated by a spaced distance of one first pattern and a second pattern adjacent to the one first pattern, a spaced distance of two second patterns among the at least two second patterns, and a spaced distance of another second pattern and another first pattern adjacent to the other second pattern and a time interval T of a sound wave generated by a spaced distance of the one first pattern and the other first pattern is different for each of the first, second, third, and fourth directions of the outward direction.

* * * * *